(12) United States Patent
Miyake

(10) Patent No.: US 6,619,857 B2
(45) Date of Patent: Sep. 16, 2003

(54) CLEANING TOOL FOR OPTICAL CONNECTOR

(75) Inventor: Taisei Miyake, Tokyo (JP)

(73) Assignee: NTT Advanced Technology Corporation, Tokyo (JP)

(*) Notice: Subject to any disclaimer, the term of this patent is extended or adjusted under 35 U.S.C. 154(b) by 0 days.

(21) Appl. No.: 10/216,422

(22) Filed: Aug. 9, 2002

(65) Prior Publication Data

US 2003/0039463 A1 Feb. 27, 2003

(30) Foreign Application Priority Data

Aug. 15, 2001 (JP) ........................................ 2001/246485

(51) Int. Cl.[7] ............................. G02B 6/00; A47L 25/00
(52) U.S. Cl. .......................... 385/85; 385/53; 385/134; 15/210.1
(58) Field of Search ..................... 81/488; 15/210.1, 15/244.1, 104.04; 385/53, 78, 85, 134, 147

(56) References Cited

U.S. PATENT DOCUMENTS

| 2001/0033728 A1 | 10/2001 | Miyake et al. |
| 2002/0166190 A1 * | 11/2002 | Miyake et al. ............. 15/210.1 |

FOREIGN PATENT DOCUMENTS

| JP | 2000-206369 | * 7/2000 | ............ G02B/6/36 |
| JP | 2000-314822 | * 11/2000 | ............ G02B/6/36 |

* cited by examiner

*Primary Examiner*—John D. Lee
(74) *Attorney, Agent, or Firm*—Blakely, Sokoloff, Taylor & Zafman

(57) ABSTRACT

A cleaning tool for an optical connector cleans a connecting end face of a ferrule fixed to an optical connecting plug, and includes a cleaning sheet and a plug holding member. The cleaning sheet cleans the connecting end face of the ferrule. The plug holding member holds the optical connecting plug such that the connecting end face of the ferrule comes into contact with the cleaning sheet to be parallel to it.

9 Claims, 3 Drawing Sheets

CLEANING TOOL FOR OPTICAL CONNECTOR

BACKGROUND OF THE INVENTION

The present invention relates to a cleaning tool for an optical connector, which cleans the connecting end face of a ferrule that forms an optical connector.

In an optical connector for an optical fiber which is used in the field of optical communications or photometry, if the connecting end face of the optical fiber is soiled or a substance such as fats and oils or dust attaches to it, the insertion loss of the optical fiber is increased to decrease the reflection attenuation amount, so an optical signal cannot be transmitted correctly. For this reason, each time the connector is attached or detached, the connecting end face of a ferrule fixed to an optical connecting plug that forms the optical connector must be cleaned, so the soil or attaching substance is removed reliably.

Conventionally, when the connecting end face of a ferrule is to be cleaned, the operator cleans it by wiping it with a cleaning tool, e.g., a cleaning sheet or paper impregnated with ethyl alcohol, or spraying nitrogen gas to it. In the wiping cleaning operation using a cleaning sheet or paper impregnated with alcohol, the amount of alcohol and the wiping degree differ depending on the operator who performs cleaning, and the cleaning effect tends to vary. Since alcohol tends to catch fire easily, it must be handled and stored with sufficient care.

Recently, a dry cleaning tool has been proposed to replace the wet cleaning tool described above. According to the dry cleaning tool, ultra-thin fiber formed into a tape-like shape is urged and rubbed against the engaging end face or connecting end face of the ferrule, thereby removing an attaching substance, e.g., a soil, dust, or oils and fats, attaching to the optical fiber end face which opposes the connecting end face of the ferrule.

With the conventional optical connector cleaning tool described above, if the connecting end face of the ferrule is polished obliquely or a stepped connecting end face is polished, it cannot be cleaned stably. More specifically, the end face of an optical connector is sometimes polished obliquely with an inclination of about 8° to 10° in order to suppress reflection by the fiber end face. In this case, if a conventional cleaning tool for an optical connector is used, the end face of a ferrule that fixes the fiber undesirably may not come into contact with the cleaning fiber. Also, a corner at the distal end face of the connecting end face of the ferrule may be caught by the cleaning fiber, so the fiber may be cut off or is pulled by it, and stable cleaning cannot be performed.

SUMMARY OF THE INVENTION

It is an object of the present invention to provide a cleaning tool for an optical connector, which can clean the obliquely polished connecting end face of a ferrule reliably and stably.

In order to achieve the above object, according to the present invention, there is provided a cleaning tool for an optical connector, which cleans a connecting end face of a ferrule fixed to an optical connecting plug, comprising a cleaning sheet member which cleans the connecting end face of the ferrule, and a plug holding member which holds the optical connecting plug such that the connecting end face of the ferrule comes into contact with the cleaning sheet member to be parallel thereto.

DESCRIPTION OF THE PREFERRED EMBODIMENT

The present invention will be described in detail with reference to the accompanying drawings.

Figure 1:
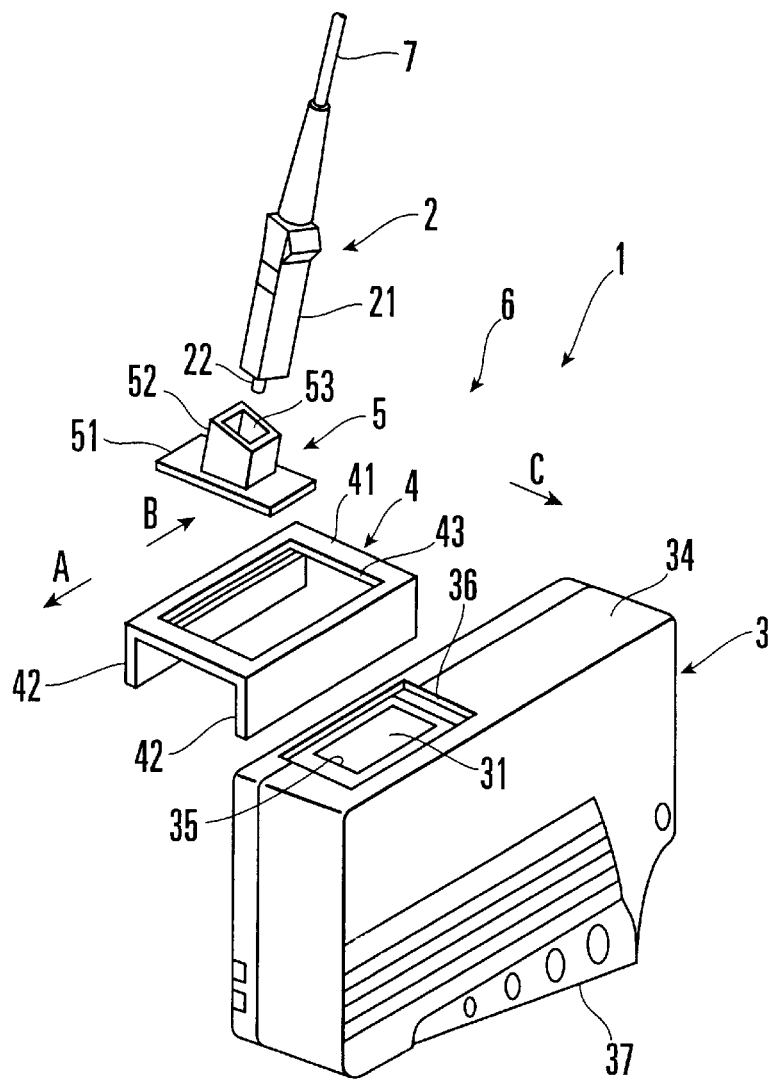
FIG. 1 is an exploded perspective view of a cleaning tool for an optical connector according to an embodiment of the present invention.

FIG. 1 shows a cleaning tool for an optical connector in an exploded state according to one embodiment of the present invention. Referring to FIG. 1, a connecting end face 23 of a ferrule 22 fixed to an optical connecting plug 2 is cleaned by using a cleaning tool 1 for an optical connector. The optical connector cleaning tool 1 has a flat box-shaped case 3 for storing a cleaning sheet 31, and an attachment 6 to be detachably attached to one long side wall 34 of the case 3.

The attachment 6 is comprised of a plug holding member 5 for holding the optical connecting plug 2 attached to one end of an optical fiber cable 7, and a guide member 4 for movably guiding the plug holding member 5 to be parallel to the cleaning sheet 31. The guide member 4 and plug holding member 5 are made of a resin mixed with an antistatic agent.

Figures 3A, 3B, 3C:
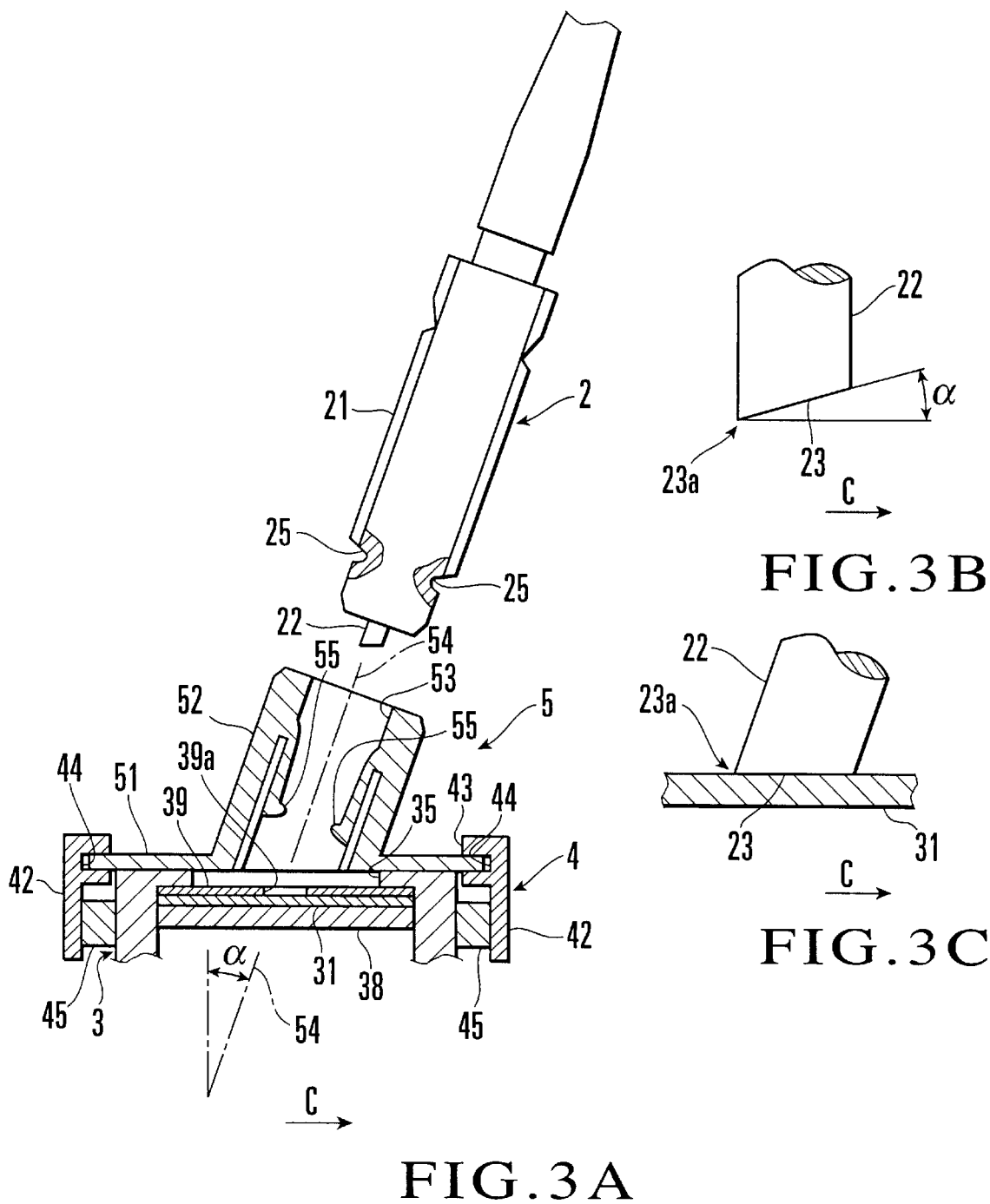
FIG. 3A is a sectional view of the main part of the cleaning tool for the optical connector shown in FIG. 1.
FIG. 3B is an enlarged front view of the distal end of the ferrule shown in FIG. 3A.
FIG. 3C is an enlarged view showing a state wherein the connecting end face of the ferrule shown in FIG. 3A is being cleaned with a cleaning sheet.
Figure 4:
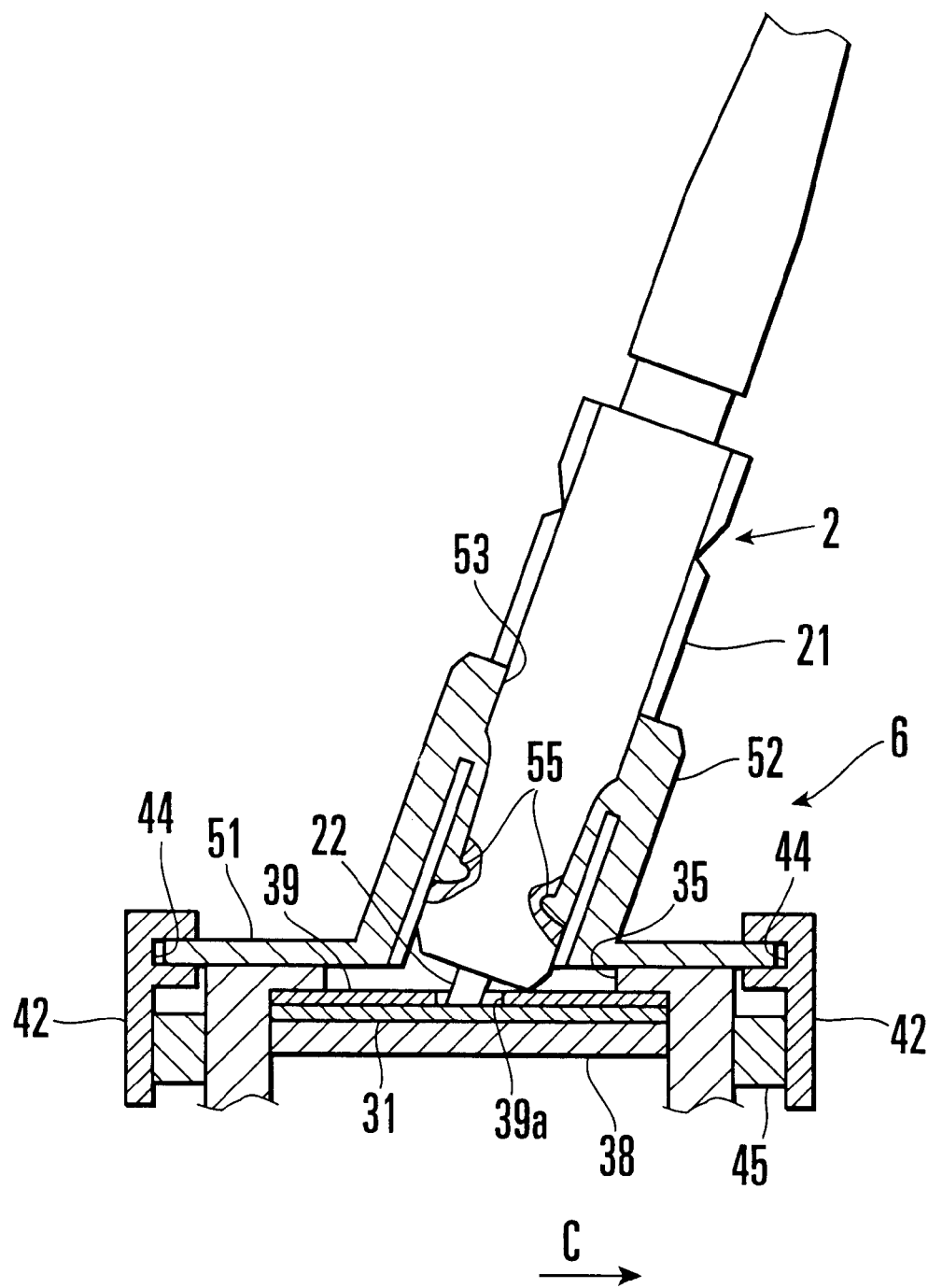
FIG. 4 is a sectional view of the main part showing a state of cleaning the connecting end face of the ferrule.

The optical connecting plug 2 has a plug main body 21 for fixing the optical fiber cable 7, and the ferrule 22 fixedly incorporated in the plug main body 21. The ferrule 22 has the connecting end face 23 which projects from the front end face of the plug main body 21 to form a surface to abut against another optical connector or optical device. An optical fiber (not shown) led from the optical fiber cable 7 extends through the center of the ferrule 22 and is fixed with an adhesive material or the like. The end face of the optical fiber opposes the connecting end face 23 of the ferrule 22, and the connecting end face 23 of the ferrule 22 and the end face of the optical fiber are mirror-polished on one plane. The connecting end face 23 of the ferrule 22 is obliquely polished with an inclination of an angle α with respect to the vertical end face, as shown in FIG. 3B. The plug main body 21 has a pair of engaging recesses 25 on its distal end circumferential surface which are displaced from each other by 180° in the circumferential direction.

In the optical connecting plug 2 with this arrangement, an engaging portion (not shown) formed in the side surface of the plug main body 21 and an engaging portion formed in the plug main body of the opposite optical connecting plug engage with each other. Thus, with the distal end faces of the optical fibers being in contact with each other, the plug main bodies 21 are optically coupled to each other to transmit an optical signal between them. Hence, if the end face of an optical fiber is soiled or a substance such as dust, oils and fats, or the like attaches to it, the optical fiber shields or reflects the light to increase the insertion loss of the optical connecting plug 2, thereby degrading the reflection attenuation amount. Consequently, the optical signal cannot be transmitted correctly.

Figure 2:
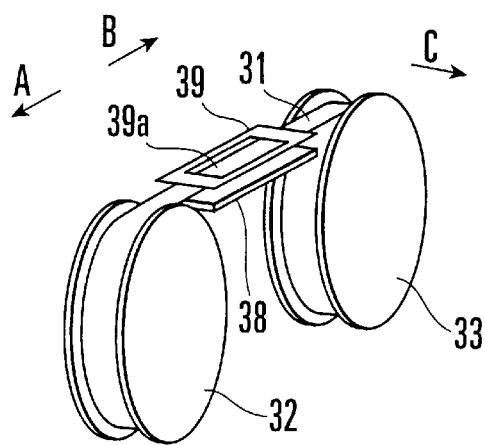
FIG. 2 is a perspective view of a cleaning sheet and reel stored in the case shown in FIG. 1.

As shown in FIG. 2, a supply pulley 32 on which the tape-like (web-like) cleaning sheet 31 is wound, a take-up pulley 33 for taking up the cleaning sheet 31 supplied from the supply pulley 32, and a ratchet mechanism (not shown) for regulating rotation of the supply pulley 32 in only a predetermined direction (take-up direction) to prevent slacking of the cleaning sheet 31 are disposed in the case 3. The case 3 has, in part of its long side wall 34, an open window 35 for exposing the cleaning sheet 31 to the outside and a shutter 36 for opening/closing the open window 35.

A rotary driving mechanism (not shown) for driving the supply pulley 32, a tape feed grip 37 for applying a rotational force to the rotary driving mechanism, and a pair of pads 38 and 39 made of an elastic material and adapted for clamping the cleaning sheet 31 exposed to the cleaning open window 35 are incorporated in the case 3. The upper pad 39 has an open window 39a corresponding to the open window 35. The pads 38 and 39 are made of a resin mixed with an antistatic agent, in the same manner as the guide member 4 and plug holding member 5 described above are.

The guide member 4 has a pair of legs 42 opposing each other at a predetermined gap, and a flat plate-like coupling portion 41 for coupling the legs 42 to each other, so it has an inverted U-shaped section. The coupling portion 41 has an open window 43 corresponding to the open window 35. As shown in FIG. 3A, a pair of guide grooves 44 each having a U-shaped section are formed in the lower edges of the two sides of the open window 43 in the longitudinal direction (directions of arrows A and B) of the sheet, such that they oppose each other. The guide member 4 positions the open window 43 in the open window 35 of the case 3, and elastically clamps the case 3 with the two legs 42 through spacers 45 made of an elastic material. Thus, the guide member 4 is detachably attached to the case 3.

The plug holding member 5 has a flat plate-like board 51 and a prismatic cylindrical portion 52. A hollow holding portion 53 having two open ends to fit on the plug main body 21 of the optical connecting plug 2 is formed in the inner surface of the cylindrical portion 52. As shown in FIG. 3A, the cylindrical portion 52 stands on the board 51 such that a center line 54 of the holding portion 53 is inclined with respect to the vertical direction by the angle α in the sheet-width direction. The holding portion 53 has a pair of opposing elastic engaging pieces 55 engageable with the engaging recesses 25 of the plug main body 21 of the optical connecting plug 2.

The two side ends of the board 51 of the plug holding member 5 engage with the guide grooves 44 of the guide member 4. Hence, the plug holding member 5 is supported to be movable in the longitudinal direction (direction of arrow A or B) of the sheet such that the board 51 becomes parallel to that surface of the cleaning sheet 31 which is exposed through the open window 35.

A method of cleaning the connecting end face 23 of the ferrule 22, including the end face of the optical fiber, by using the optical connector cleaning tool 1 with the above arrangement will be described.

First, the tape feed grip 37 is held and pushed into the case 3. Thus, the shutter 36 is opened in an interlocked manner, and the cleaning sheet 31 exposes to the outside through the open windows 35, 39a, and 43. Simultaneously, the rotary driving mechanism is driven to rotate the take-up pulley 33 in the take-up direction. As the take-up pulley 33 rotates, the supply pulley 32 feeds a predetermined amount of cleaning sheet 31, and the unused portion of the cleaning sheet 31 is supplied to a position corresponding to the open windows 35, 39a, and 43.

The plug main body 21 of the optical connecting plug 2 is inserted into the cylindrical portion 52 of the plug holding member 5, so the engaging recesses 25 of the holding portion 53 and the elastic engaging pieces 55 engage with each other. The plug main body 21 is fixed to the holding portion 53 such that its forward/backward (vertical) movement and rotational movement are regulated. In this state, the connecting end face 23 of the ferrule 22 travels into the case 3 through the open windows 43, 39a, and 35, and is urged against the cleaning sheet 31. At this time, as shown in FIG. 3B, the ferrule 22, the connecting end face 23 of which has been polished obliquely with an inclination of the angle α with respect to the horizontal plane, is guided by the cylindrical portion 52 which stands on the board 51 with an inclination of the angle α. As a result, as shown in FIG. 3C, the connecting end face 23 of the ferrule 22 comes into contact with the surface of the cleaning sheet 31 to be parallel to it.

Subsequently, the plug main body 21 is held and moved in the longitudinal direction (direction of arrow A or B) of the sheet. Hence, the plug holding member 5 becomes integrated with the plug main body 21 and is guided by the guide member 4, so that it moves on the open window 35 to be parallel to the cleaning sheet 31.

According to this embodiment, since the connecting end face 23 of the ferrule 22 is rubbed by the cleaning sheet 31 while being held in contact with the cleaning sheet 31 to be parallel to it, the connecting end face 23 is cleaned reliably in a stable state. In addition, since the plug holding member 5 is guided by the guide member 4, the cleaning time is shortened.

Because of engagement of the engaging recesses 25 and elastic engaging pieces 55, the optical connecting plug 2 is held by the holding portion 53 of the plug holding member 5 such that its rotational movement is regulated. Thus, a trouble in which a corner 23a of the connecting end face 23 is caught by the cleaning sheet 31 does not occur. Consequently, a problem such as tear of the cleaning sheet 31 or inability of stable cleaning because the cleaning sheet 31 is dragged by the corner 23a of the connecting end face 23 is solved.

In the open windows 35, 39a, and 43, the cleaning sheet 31 is supported by the pad 38 serving as a sheet support member made of an elastic material. Thus, the cleaning sheet 31 comes into contact with the connecting end face 23, urged against the cleaning sheet 31, with a sufficient contact amount. Therefore, insufficient contact of the cleaning sheet 31 with the connecting end face 23 can be prevented.

As the guide member 4 and plug holding member 5 are made a resin mixed with an antistatic agent, static electricity that occurs between the guide member 4 and plug holding member 5 when the plug holding member 5 comes into slidable contact with the guide member 4 can be suppressed. As the pad 38 is also made of the resin mixed with the antistatic agent, static electricity that occurs between the pad 38 and cleaning sheet 31 when the cleaning sheet 31 comes into slidable contact with the pad 38 can be suppressed. As a result, dust or the like can be prevented from attaching to the connecting end face 23 of the ferrule 22 due to the static electricity that electrifies the pad 38 and cleaning sheet 31.

A case will be described wherein the connecting end face 23 of the ferrule 22 is not obliquely polished but is polished flatly.

First, the guide member 4 detachably attached by the spacers 45 is removed from the case 3 together with the plug holding member 5, and is set to oppose the open window 35. In this state, the optical connecting plug 2 is held, and the connecting end face 23 of the ferrule 22 fixed to the optical connecting plug 2 is rubbed by the cleaning sheet 31 exposed through the open window 35, thereby cleaning the connecting end face 23.

According to this embodiment, since the attachment 6 is detachably attached to the case 3, not only an obliquely polished connecting end face but also various types of connecting end faces can be cleaned, so the cleaning tool 1 can be used more conveniently.

In this embodiment, as shown in FIG. 3A, the cylindrical portion 52 is inclined by the angle $\alpha$ with respect to the vertical direction in the direction of sheet width (direction of arrow C). If the connecting end face 23 of the ferrule 22 is not oblique but vertical, the cylindrical portion 52 may not be inclined but may be set upright in the vertical direction.

As has been described above, according to the present invention, since the optical connecting plug is reliably moved by the guide member to be parallel to the cleaning sheet member, the connecting end face of the ferrule is cleaned reliably in a stable state. Also, the cleaning time is shortened.

Even when the connecting end face of the ferrule is obliquely polished, or is an engaging end face formed by a means other than polishing, it can be cleaned reliably. Thus, no trouble occurs during cleaning. Also, dust or the like can be suppressed from attaching to the connecting end face of the ferrule by static electricity.

What is claimed is:

1. A cleaning tool for an optical connector, which cleans a connecting end face of a ferrule fixed to an optical connecting plug, comprising:

a cleaning sheet member which cleans the connecting end face of the ferrule; and a plug holding member which holds the optical connecting plug such that the connecting end face of the ferrule comes into contact with said cleaning sheet member to be parallel thereto.

2. A tool according to claim 1, further comprising a guide member for supporting said plug holding member to be movable parallel to a sheet surface of said cleaning sheet member.

3. A tool according to claim 1, wherein said plug holding member has a holding portion which holds the optical connecting plug so as to be inclined with respect to a sheet surface of said cleaning sheet member by the same angle as a polishing angle for the connecting end face of the ferrule.

4. A tool according to claim 1, wherein said plug holding member has locking means for detachably locking the optical connecting plug.

5. A tool according to claim 2, further comprising a flat box-shaped case for which stores said cleaning sheet, said guide member being detachably attached to the case.

6. A tool according to claim 5, further comprising a supply pulley which is stored in the case and on which said web-like cleaning sheet member is wound, a take-up pulley which is stored in the case and which takes up said cleaning sheet member supplied from said supply pulley, and an open window which is formed in a side wall of the case and through which said cleaning sheet member, traveling from said supply pulley to said take-up pulley, exposes to an outside of the case, said guide member being detachably attached to the side wall of the case to correspond to said open window.

7. A tool according to claim 6, wherein said open window is formed in the side wall of the case in a longitudinal direction of said cleaning sheet member, and said guide member guides said plug holding member such that said optical connecting plug is movable along said open window.

8. A tool according to claim 2, further comprising a sheet support member for supporting said cleaning sheet member and made of an elastic material.

9. A tool according to claim 8, wherein said sheet support member, a case, said plug holding member, and said guide member are made of an antistatic material.

* * * * *